United States Patent

[11] 3,576,230

| [72] | Inventors | Lael B. Taplin<br>Livonia;<br>Jerome G. Rivard, Birmingham, Mich. |
|---|---|---|
| [21] | Appl. No. | 792,904 |
| [22] | Filed | Jan. 15, 1969 |
| [45] | Patented | Apr. 27, 1971 |
| [73] | Assignee | The Bendix Corporation |

[54] FLUIDIC AUTOMOBILE STEERING SYSTEM WHICH AUTOMATICALLY COMPENSATES FOR WIND GUSTS AND THE LINE
21 Claims, 6 Drawing Figs.

[52] U.S. Cl. ........................................... 180/79.2, 137/81.5
[51] Int. Cl. ........................................... B62d 5/06
[50] Field of Search ........................................... 180/79.2, 79.1; 244/78, 77; 114/144, 150; 137/81.5

[56] References Cited
UNITED STATES PATENTS

| 2,865,462 | 12/1958 | Milliken et al. | 180/79.2 |
| 2,902,104 | 9/1959 | Schilling | 180/79.2 |
| 2,987,135 | 6/1961 | Harvey | 180/79.2 |
| 3,011,579 | 12/1961 | Milliken et al. | 180/79.2 |
| 3,254,864 | 6/1966 | Kent et al. | 244/78 |
| 3,456,752 | 7/1969 | Fonda | 180/79.2 |

*Primary Examiner*—Kenneth H. Betts
*Assistant Examiner*—John A. Pekar
*Attorneys*—William L. Anthony, Jr. and Plante, Hartz, Smith & Thompson

ABSTRACT: An automobile steering system having a fluidic rate sensor, a fluidic amplifier and a fluid operated actuator to provide steering corrections to compensate for lateral disturbances such as wind gusts and road irregularities.

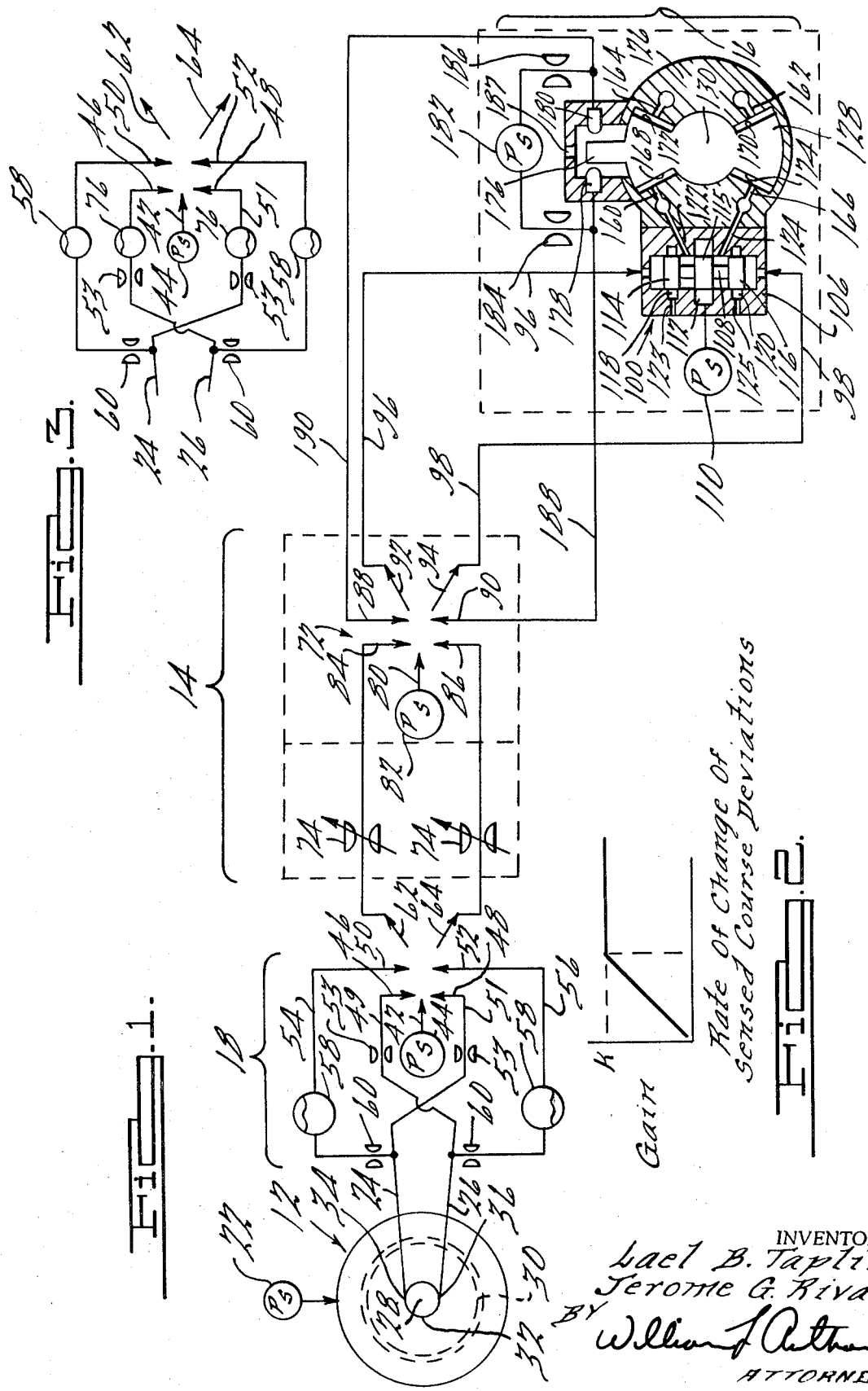

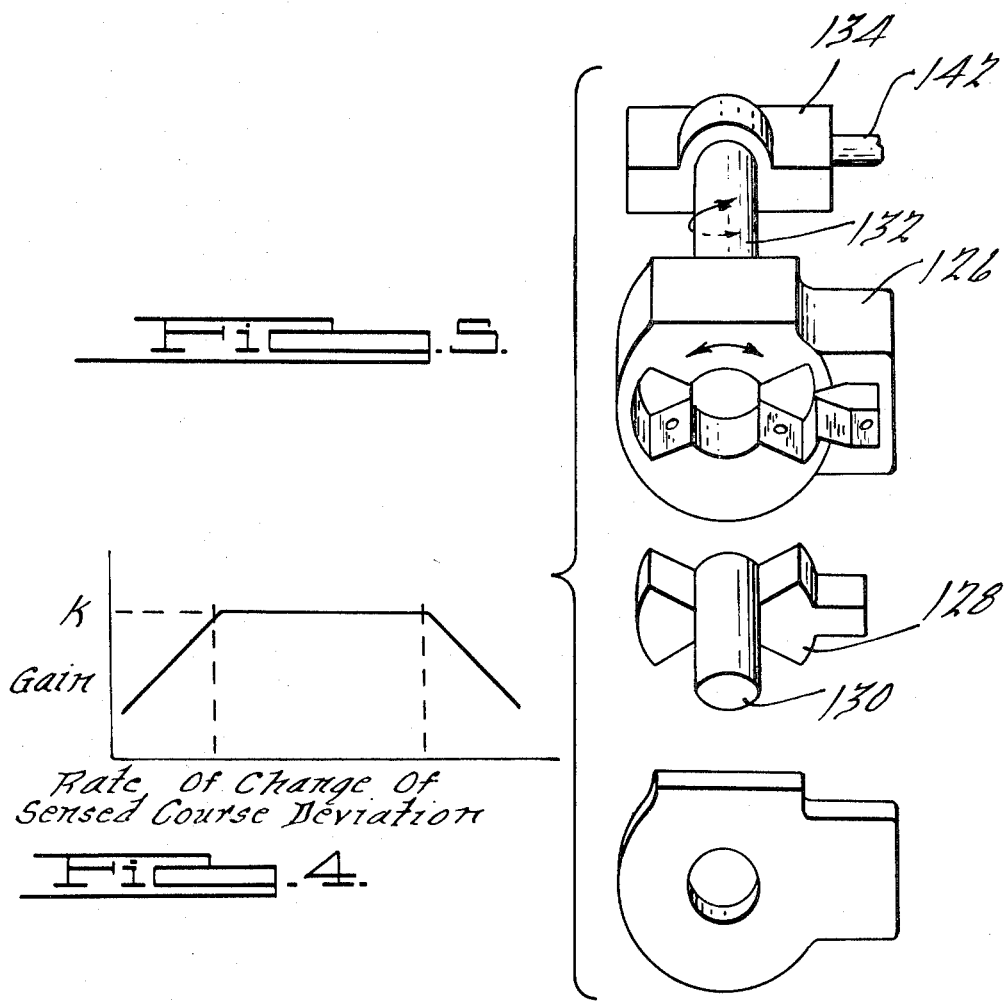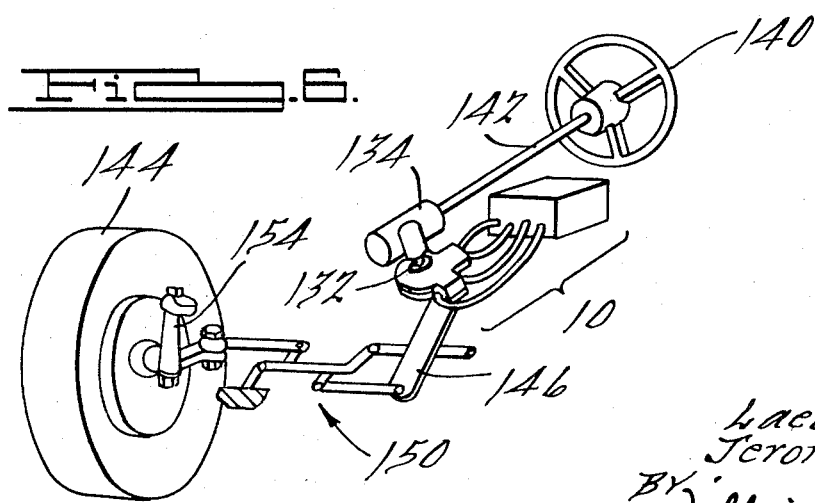

FLUIDIC AUTOMOBILE STEERING SYSTEM WHICH AUTOMATICALLY COMPENSATES FOR WIND GUSTS AND THE LINE

BACKGROUND OF THE INVENTION

1. Field of the Invention

Steering systems for automobiles, and particularly, steering systems which automatically compensate for lateral disturbances.

2. Description of the Prior Art

Steering systems for automobiles which automatically compensate for lateral disturbances such as wind gusts and road irregularities are known in the art. Particularly, typical prior art systems have a rate sensor of the electrical type, an electronic amplifier for amplifying the output signal of the rate sensor, and an actuator system operable in response to the sum of driver steering commands and the output of the amplifier to control the steering of the vehicle. For example, see the U.S. Pat. to Harvey—No. 2,987,135.

The above-described prior art systems tend to be complicated and unreliable and furthermore, are prohibitively costly. For example, market analysis indicates that the rate sensors used in the prior art systems cost alone as much as the buying public would spend for an entire system. Also, by virtue of their complexity, they are unreliable in the environment of minimal maintenance prevalent in typical automobile usage. Accordingly, due to the expense and lack of reliability of prior art methods and apparatus, a suitable lateral disturbance compensating system has not been made available to the public.

In addition to the expense and lack of reliability of prior art systems, other factors have contributed to the absence of the practical application of these systems. For example, prior art automobile control systems of this nature do not effectively distinguish between course deviations of the vehicle due to driver steering commands and course deviations of the vehicle due to lateral disturbances. Accordingly, prior art systems tend to provide steering corrections for course deviations due to driver commands as well as those due to lateral disturbances. These steering corrections oppose driver steering commands thereby tending to nullify the driver steering commands. It will be appreciated that this effect is highly undesirable.

Prior art automatic steering systems are also characterized by having unlimited authority, that is, the range of steering corrections that can be provided by the automatic system is substantially equal to the range of steering corrections which may be provided by the driver. In this manner, an erroneous correction signal due to a malfunction of the control system can nullify a driver steering command. Even more importantly, an erroneous correction signal can completely override the driver's capability of providing a corrective command. It will thus be clear that the systems of the prior art tend to be inherently dangerous since malfunctions of the prior art automatic control systems cannot be expeditiously and safely compensated for by the driver.

It is known in the aircraft control art to provide a fluidic system for damping pitch oscillations of an aircraft. For example, see the U.S. Pat. to Kent et al.—No. 3,254,864 which discloses a pitch-rate dampening apparatus having a fluidic rate sensor, a plurality of fluidic amplifiers, and an actuator connected to a control surface of an aircraft. Pilot commands are fed into the system by a fluid link with one of the amplifiers of the control system. The patent to Kent discloses a pitch-rate dampening system, that is, the system senses and corrects rotation of the aircraft about a transverse axis as distinguished from sensing and correcting for yaw about a vertical axis.

It is well known in the art that control apparatus for damping the pitch-rate of aircraft are responsive to very low frequency oscillations to correct for the phugoid mode of oscillation. For example, an explanation of the operation of the apparatus of the Kent patent with respect to phugoid motions appear in an article by J.H. Lindahl in Control Engineering, Sept. 1964, pages 99 and 100. Accordingly, the control apparatus of the Kent patent is designed to be responsive to very low frequency pitch rotation of the aircraft. It thus will be appreciated that a pilot commanded pitch, even of low rate or frequency, will be sensed and compensated for by the control apparatus. Therefore, a pilot pitch command will be cancelled by the control apparatus, and hence the control apparatus of Kent has a deficiency which is similar to those of prior art automobile control systems in that it does not effectively distinguish between pilot commands and pitch oscillations.

It will also be appreciated that the control apparatus of the patent to Kent is also a full authority system, that is, the automatic control system has the same authority as that provided for the pilot. Therefore, failure of the automatic control system could provide an error signal at least as great as the pilot's capability of introducing a command signal thereby placing the aircraft out of the pilot's control. Accordingly, the control system of the Kent apparatus is as inherently dangerous as the control system of the automotive art.

Established automotive safety considerations require a failsafe steering system, that is, one which SUMMARY the driver to retain control of the vehicle in the event of a malfunction of an automatic control system. Preferably, the failsafe system should provide a mechanical link between the driver and the dirigible wheels of the vehicle if a malfunction occurs. It will be appreciated that the Kent control apparatus is not suitable for use in an automobile since the control of the pilot over the aircraft is wholly dependent on the operability of the fluidic control system and hence there is no provision for pilot control in the event of a failure of the fluidic system.

SUMMARY OF THE INVENTION

The present invention provides an inexpensive and reliable fluidic control system for automobiles which automatically compensates for lateral disturbances such as wind gusts and road irregularities. Particularly, it incorporates a fluidic sensor for detecting a course deviation, a fluidic system receiving the output of the sensor for providing an amplified signal representative of a required course correction, and an actuator connected to the dirigible wheels of the vehicle to steer the wheels according to the amplified signal.

The system disclosed herein further includes a fluidic circuit which effectively distinguishes between course deviations of the vehicle due to driver steering commands and course deviations due to lateral disturbances such that it corrects only for the latter course deviations. Accordingly, the automatic compensating system of this invention does not tend to cancel driver steering commands. In this regard, it has been found that usual driver steering commands, for example, those encountered in typical nonemergency driving situations, provide course deviations having rates of change up to a first predetermined rate of change. It also has been found that driver steering commands in response to emergencies generally provide course deviations having rates of change above a higher, second predetermined rate of change. It still further has been discovered that the above two rates of change flank an intermediate range in which most course deviations occur which are due to lateral disturbances. Therefore, almost all course deviations due to lateral disturbances occur at rates of change within a predetermined range of rates of change whereas driver course corrections generally occur at rates outside of the predetermined range. The lateral disturbance compensating system of this invention provides a steering system which responds to course deviations within the above defined particular range, and therefore, driver steering commands are not cancelled by the system regardless of whether they are usual or emergency commands. It will then be appreciated that the lateral disturbance compensating system 10 will distinguish between desired course deviations due to driver steering commands and undesired course deviations due to lateral disturbances.

It has also been found that relatively small course corrections are sufficient to compensate for nearly all lateral disturbances. To take advantage of this fact, the automatic compensating system disclosed herein is provided with means for limiting its authority to a range which is sufficient to compensate for lateral disturbances but is small compared to the driver's range of steering authority. In this manner, malfunctions of the automatic compensating system readily can be overcome by a driver steering correction. Accordingly, the automatic compensating system of this invention is substantially safer in operation than prior art systems.

As a still further feature of the automobile steering system disclosed herein, a fluidic automatic compensating system is provided in combination with means providing a direct mechanical link between the driver and the dirigible wheels in event that the fluidic automatic compensating system becomes inoperative. In this manner, the driver retains his capability of controlling the vehicle regardless of the operability of the fluidic automatic compensating system.

In view of the above discussion, it will be appreciated that the novel steering system disclosed herein overcomes the various operational disadvantages of the prior art systems. Furthermore, it is a novel adaptation of fluidic circuits and components which are inexpensive and reliable in operation.

DESCRIPTION OF THE DRAWINGS

FIG. 1 is a schematic illustration of a fluidic system according to this invention which automatically compensates for lateral disturbances.

FIG. 2 is a chart illustrating the functioning of a circuit incorporated in the system of FIG. 1.

FIG. 3 is a schematic illustration of a modification of a portion of the circuit of FIG. 1.

FIG. 4 is a chart illustrating the functioning of the circuit of FIG. 3.

FIG. 5 is an exploded perspective view of a limited authority rotary actuator incorporated in the system of FIG. 1.

FIG. 6 is a perspective view of an automobile steering system incorporating the lateral disturbance compensating system of FIG. 1.

DESCRIPTION OF THE PREFERRED EMBODIMENT

In FIG. 1, a system 10 for automatically compensating for lateral disturbances is schematically illustrated. The system 10 includes a course deviation sensor 12, an amplifying circuit 14, and an actuator 16. In the preferred embodiment, the automatic lateral disturbance compensating system 10 includes a circuit 18 for essentially limiting the response of the system 10 to a predetermined range wherein course deviations due to lateral disturbances primarily occur, for example, to course deviations having rates of change above a predetermined rate of change. The circuit 18 may be replaced by other suitable circuits for accomplishing this function, for example, by the circuit 218 of FIG. 3 which limits the response of the system 10 to an intermediate predetermined range between the above-mentioned predetermined rate and a higher second predetermined rate within which the effects of most lateral disturbances occur.

The course deviation sensor 12 may be a vortex rate sensor which receives pressurized fluid from a source 22, and upon lateral course deviations of a vehicle, will generate a differential pressure between lines 24 and 26 which is representative of the direction and amount of angular velocity of the vortex rate sensor 12 about its axis 28. Vortex devices of this nature are well known in the art and are illustrated in U.S. Pat. No. 3,351,080, and application, Ser. No. 547,595, assigned to the assignee of this invention. For one example, the rate sensor 12 may have a vortex chamber including a porous element 30 through which supply fluid passes to an axial outlet opening 32. Rotational motion of the vortex rate sensor 12, produced by a course deviation of the vehicle, is imparted to the supply fluid by the porous element 30 thereby causing vortical flow in the device which may be measured at the outlet opening 32. One device for measuring vortical flow at the outlet opening consists of a pair of tangentially oriented pickoff tubes 34 and 36 positioned near the outlet 32, each of the tubes receiving a portion of the vortical flow. It can be seen from FIG. 1 that a rotational flow in the clockwise direction will cause a pressure rise at pickoff 34 and a pressure drop through aspiration at pickoff 36. Consequently, a pressure differential is created between lines 24 and 26 with the higher pressure being in line 24. It can also be seen that a counterclockwise flow will cause a pressure rise at pickoff 36 and a pressure drop at pickoff 34 thereby creating a pressure differential between lines 24 and 26 with the higher pressure in line 26. As will be appreciated by those skilled in the art, other sensing devices, both angular and rectilinear, are available to sense course deviations of a vehicle. Moreover, the sensing devices may provide signals representative of either acceleration rates of course deviations or amounts of course deviation. As an example of the former, the output of the rate sensor 12 may be differentiated by any known differentiating circuit to provide a signal representative of acceleration rates of course deviation. As an example of the latter, the output of the rate sensor 12 may be integrated by any known integrating circuit to provide a signal representative of the amount of course deviation.

The circuit 18 for limiting the response of the system 10 to course deviations having rates of change within a predetermined range, for example, to course deviations not caused by normal driver steering commands, i.e., having rates of change above a predetermined rate of change, is essentially a proportional jet-on-jet device 40 adapted to cancel output signals from the sensor 12 which represent course deviations having rates of change below the predetermined rate of change. Particularly, the jet-on-jet device 40 has a supply port 42 connected to a source 44 of pressurized fluid, a first pair of control ports 46 and 48 connected to the output of the vortex rate sensor 12 by lines 49 and 51, and a second pair of control ports 50 and 52 connected to the vortex rate sensor 12 by lines 54 and 56, respectively. Lines 49 and 51 are provided with restrictions 53 and lines 54 and 56 are provided with fluid capacities or volumes 58 and restrictions 60. The volumes and restrictions of the system 10, i.e., of volumes 58 and 76 (FIG. 3), and restrictions 53 and 60 may be made variable to permit convenient adjustment of the operating characteristics of the system 10 such as the frequency response of the circuit 18 or 218. In the case of incompressible fluids, the volumes 58 are provided with flexible diaphragms 59 which provide a space for containing a compressible medium 61 which, for example, may be air. In the case of compressible fluids such as air, flexible diaphragms 59 are not necessary. The proportional jet-on-jet device 40 is also provided with a pair of output channels 62 and 64. It will be appreciated by those skilled in the art that the supply flow from supply port 42 will be diverted to output channel 62 in response to a flow from either control port 48, control port 52, or both, and further that the supply flow will be diverted to output channel 64 in response to a flow from either the control port 46, the control port 50, or both. The device described herein is a proportioning device, and therefore, the amount of flow diverted to one or the other output channel depends upon the relative amounts of flow from the control ports. Moreover, opposing flows from the control ports on opposite sides of the device will have a net effect which is proportional to the difference in their flows. That is to say, if the flow from the control port 46 is greater than the flow from the control port 48, the supply flow from the supply port 42 will be diverted from output channel 64 in proportion to the difference between the flows from the control ports 46 and 48. On the other hand, if the flow from each of the control ports are equal, the flow to the output channels 62 and 64 will be equal and therefore the net signal from the device 40 will be zero.

It will be appreciated that signals having high rates of change will be substantially attenuated by the volumes 58 since the fluid capacities of the volumes tend to delay and flatten signals of high rates. Therefore, the effect of the volumes 58 is to render the signals having high rates of change passing through lines 54 and 56 relatively ineffective in diverting the supply flow in the device 40. On the other hand, the flows through the lines 54 and 56 having low rates of change pass substantially unimpeded.

Considering now a fluid signal on lines 24 and 26 representative of course deviations having rates of change below the predetermined rate of change, it will be appreciated that the signal will be substantially unimpeded by the volumes 58 as explained above. Since the same signal passes unimpeded through both sets of lines, 49 and 51, and 54 and 56, equal signals will be placed in opposition in the device 40 such that the net output from the device 40 will be zero. Considering now a fluid signal on lines 24 and 26 representative of course deviations having rates of change above the predetermined rate, it will be appreciated that the signals through lines 54 and 56 will be reduced by volumes 58 and thereby rendered ineffective. However, the signal will pass unimpeded through lines 49 and 51 to the device 40. Accordingly, the device 40 will respond to the signal on lines 49 and 51 thereby providing an output signal from the circuit 18 in output channels 62 and 64 which is representative of course deviations having rates of change above the predetermined rate of change.

The gain or transfer function of circuit 18 as a function of the frequency of the input signal $\Delta P_{in}$ is shown in the chart of FIG. 2. Particularly, the gain of the circuit 18 as a function of frequency may be expressed by the equation:

$$\frac{\Delta P_{out}}{\Delta P_{in}} = \frac{KTs}{1+Ts}$$

where:
$\Delta P_{out}$ = the pressure differential on lines 62 and 64.
$\Delta P_{in}$ = the pressure differential on lines 24 and 26.
$K$ = a constant
$T$ = the time constant of the lines 54 and 56 containing the volumes 58 and orifices 60, and
$s$ = complex frequency of the input signal.

As can be seen in FIG. 2, a transition range exists between those signals having rates of change which are substantially reduced by the volumes 58 and those signals which are not reduced. Even though a transition range exists, it may be defined appropriately as a nominal predetermined rate of change. The optimum nominal predetermined rate of change is normally set by analysis of the actual performance characteristics of the given vehicle type. Once a desired predetermined rate of change has been determined, the passage size of restriction 60 and the capacity of volume 58 may be adjusted to alter the time constant $T$ to provide that nominal rate. For example, either an increase in the capacity of the volumes 58 or a decrease in the passage size of restrictions 60 will increase the time constant $T$ thereby lowering the predetermined rate of change, and visa versa.

In FIG. 3, a circuit 218 is shown which may be used in the place of the circuit 18 of FIG. 1. The circuit 218 is a band-pass circuit. That is, it only permits the passage of signals having rates of change within a predetermined range of rates of change defined by two boundaries rather than a single boundary as discussed above. Particularly, a range is defined which is typical of course deviations due to lateral disturbances. Circuit 218 is essentially the same as the circuit 18 of the system of FIG. 1 except volumes 76 are interposed in lines 49 and 51. Volumes 76 are equal in capacity but are smaller in capacity than the volumes 58. The volumes 76 are sized such that they have no substantial effect until a second predetermined rate of course deviation is reached at which point signals of that rate or above are substantially impeded such that they are rendered substantially ineffective in diverting flows in the device 40, i.e., effectively cancelled. Therefore, in the event of a course deviation due to an emergency steering command, i.e., a course deviation having a rate of change above the second predetermined rate, it will be appreciated that all signals from the rate sensor 12 are rendered ineffective by the effects of the volumes 58 and 76 such that the output signal of the device 40 is negligible. Accordingly, signals below a first predetermined rate of change and above a second predetermined rate of change are substantially cancelled by the circuit 218.

The above stated result can be better seen by the equation:

$$\frac{\Delta P_{out}}{\Delta P_{in}} = K \frac{(T_1 - T_2)s}{(1+T_1 s)(1+T_2 s)}$$

where:
$\Delta P_{out}$ = the pressure differential on lines 62 and 64,
$\Delta P_{in}$ = the pressure differential on lines 24 and 26,
$K$ = a constant
$T_1$ = the time constant of the flow lines 54 and 56 having volumes 58 and orifices 60,
$T_2$ = the time constant of the flow lines 49 and 51 having volumes 76 and orifices 53, and
$s$ = complex frequency of the input signal.

The above relationship is illustrated in FIG. 4 wherein the gain of the circuit 218 is shown as a function of the rate of change or frequency of the input A $\Delta P_{in}$.

The amplifying circuit 14 comprises a fluidic amplifier 72 and a pair of variable restrictions 74. It will be appreciated that the variable restrictions 74 may be used to adjust the gain of the signal passing therethrough, for example, to tailor the system 10 to suit the characteristics of individual vehicles.

The fluid amplifier 72 is a jet-on-jet proportional device having a supply port 80 connected to a source 82 of pressurized fluid, a pair of control ports 84 and 86, a pair of feedback ports 88 and 90, and a pair of output channels 92 and 94 connected to output lines 96 and 98. Although only a single amplifier is shown, it will be understood that a series of amplifiers may be used. It will be appreciated that the output signal on output channels 96 and 98 is an amplified signal which is representative of the sum of the control signal flow through control ports 84 and 86 and a feedback flow through the feedback ports 88 and 90. To facilitate the teaching of the present invention, the feedback system will be considered inoperative at the present time. It is understood then that the net output from the response limiting circuit 18 is amplified by the amplifying circuit 72 to provide an amplified output signal on flow lines 96 and 98 which is representative of course corrections required to compensate for course deviations sensed by vortex rate sensor 12.

The limited authority actuator 16 is adapted to be interposed in the vehicle main steering system, for example, as shown in FIG. 6, to provide steering corrections supplemental to the operator steering commands. The actuator 16 comprises a spool valve 100, an actuator output portion 102 and a feedback system 104.

The spool valve 100 comprises a housing 106 and a spool 108 being axially movable therein in response to fluid signals on amplifier circuit output lines 96 and 98. A source 110 of pressurized supply fluid communicates with a central supply chamber 112 formed by the housing 106. The spool 108 is provided with lands 114, 115 and 116 cooperating with the walls of housing 106. a pair of annular return chambers 118 and 120 are formed in the housing 106 having return passages 123 and 125, respectively, communicating therewith. For example, the return passages may be connected to a supply reservoir by flow lines (not shown). The housing 106 is further provided with a pair of output passages 122 and 124 having openings between the return chambers and the supply chambers. Spool valves of this construction are well known in the art and therefore only a brief description of the operation of the spool valve 100 will follow. Assuming that the fluid flows and consequently the pressure in the lines 96 and 98 are equal, the spool 108 will be balanced in a central position thereby positioning the spool lands 114, 115 and 116 to prevent any substantial flow between the output passages 122 and 124, and either the supply chamber 112 or the return chambers 118 and 120. If, however, there is a differential flow between the lines 96 and 98 because the course of the vehicle has been laterally disturbed, a differential pressure is established across the spool 108 which causes it to move in one direction, communicating one of the output passages 122 or 124 to the supply chamber 112 thereby allowing flow from the source 110 of supply fluid to the selected one of the output passages 122 or 124. Moreover, the above movement of the spool 108 communicates the other of the output passages to the corresponding return passage 123 or 125.

The output passages 122 and 124 of spool valve 100 communicate with the actuator output portion 102 which comprises a housing 126 and a rotatable member 128 therein fixedly connected to the actuator output shaft 130. As shown in FIG. 1, the circular sides of the rotatable member 128 cooperate with the walls of the housing 126 to form a substantial fluid seal therewith. The operating relationship of the housing 126, the rotatable member 128 and the actuator output shaft 130 may be more easily seen in the exploded view of these components in FIG. 5.

The actuator output portion 102 responds to fluid signals from passages 122 and 124. Particularly, the housing 126 is provided with a pair of ports 160 and 162, connected by a passage not shown, communicating with the spool valve output passage 122 and is further provided with a pair of ports 164 and 166, also connected by a passage not shown, communicating with the spool valve output passage 124. As can be seen in FIG. 1, a pressure in the line 122 causes a corresponding pressure against the sides 168 and 170 of the rotatable member 128 causing clockwise rotation of that member whereas a pressure in the line 124 cause a pressure against the sides 172 and 174 of the rotatable member 128 causing counterclockwise rotation. The rotation of the rotatable member 128 causes corresponding rotation of the actuator output shaft 130.

In FIG. 1, it can be seen that the rotatable member 128 is provided with an integral extension 176, and a pair of flow nozzles 178 and 180 positioned on opposite sides of the extension 176. The nozzles 178 and 180 communicate with a source 182 of pressurized fluid through a pair of restrictions 184 and 186, respectively. The housing 126 is provided with a return passage 187 for egress of fluid from nozzles 184 and 186. The return passage 187 may be connected to a supply reservoir. It will be appreciated that the rotation of the rotatable member 128, and the consequent movement of the extension 176 with respect to the nozzles 178 and 180, causes a variation in the pressure immediately upstream of the nozzles 178 and 180 due to a variation in the flow restriction at the nozzle. The pressure immediately upstream of the nozzles 178 and 180 is transmitted to the lines 188 and 190, respectively, thereby causing a variable rate of fluid flow through these lines from the source 182 which is representative of the position of extension 176, and accordingly, the position of the actuator output shaft 130. The flow signals in the lines 188 and 190 communicate with the feedback ports 90 and 88, respectively, of the proportional amplifying device 72.

As can be seen in FIG. 5, the housing 126 of the limited authority actuator 16 is connected to the output shaft 132 of the main steering unit 134 for rotation therewith. It will be appreciated then that the housing 126 rotates in response to driver steering commands. The rotatable member 128 and consequently the actuator output shaft 130 are allowed limited rotary movement with respect to housing 126 by virtue of their configuration as shown in FIGS. 1 and 5. The actuator output shaft 130 is connected to the dirigible wheels for turning of the vehicle.

The operative relationship between the actuator output shaft 130 and the dirigible wheels may be more clearly seen with reference to FIG. 6 in which a steering system for a land vehicle is shown having a steering wheel 140 for control of the vehicle by the operator, a steering shaft 142 connecting the steering wheel 140 with a main steering unit 134. Operator commands are transmitted through the main steering unit 134 to the main steering output shaft 132, and in turn to the limited authority actuator housing 126. The limited authority actuator output shaft 130 is connected to a Pitman arm 146 for rotation thereof. The Pitman arm 146 is connected to the dirigible wheels 144 (one not shown for clarity) through suitable known steering linkage 150 for turning of the wheels 144 about the pivotal axes of the uprights 154, and consequently, steering of the vehicle. Although this invention is described with respect to a conventional steering apparatus for an automobile, it will be appreciated it can be equally applied to other methods for steering land vehicles.

In view of the above, it will be appreciated that driver steering commands are transmitted from the main steering unit output shaft 132 through the limited authority actuator 16 to the dirigible wheels 144. However, the limited relative rotation provided between actuator output shaft 130 and the housing 126 permits the introduction of lateral disturbance steering corrections. This relative rotation between the actuator output shaft 132 and housing 126 is not transmitted back to the vehicle operator to any degree because of the low compliance of the steering train in the reverse direction. It will thus be appreciated that the dirigible wheels are steered by the sum of the operator steering commands and the course correction signals provided by automatic lateral disturbance compensating system 10. It will also be appreciated that the operator has a wide range of authority over vehicle steering whereas the lateral disturbance compensating system 10 has a substantially more limited authority by virtue of the configuration of rotatable member 128 and the actuator housing 126. However, the limited authority of the compensating system 10 is sufficient to correct course deviations due to the lateral disturbances. By virtue of the limited authority of the lateral disturbance compensating system 10, erroneous steering corrections due to malfunctions of the system are easily overridden by operator steering commands.

As still an additional advantage to the steering system according to this invention, a mechanical link is provided between the steering wheel 140 and the dirigible wheels 144 in the event that the automatic compensating system 10 fails. Particularly, it will be appreciated that the maximum relative rotary movement between the actuator output shaft 130 and the main steering system output shaft 132 is limited to only a few degrees by the configuration of the actuator housing 126. When the relative movement between the two shafts reaches its maximum limit in either direction, the rotatable member 128 abuts against the actuator housing 126 thereby mechanically linking the shafts 132 and 130. Accordingly, a mechanical link is provided between the steering wheel 140 and the dirigible wheels 144 in the event of the failure of the lateral disturbance compensating system 10.

To facilitate the teaching of the operation of the invention, consider the case where a vehicle equipped with the lateral disturbance compensating system 10 is proceeding on a straight course and does not encounter a lateral disturbance. Since the vehicle is proceeding on a straight course, and consequently there is no course deviation, the output signal from the vortex rate sensor 12 will be zero and hence the flows through lines 24 and 26 will be equal and constant, i.e., a zero rate of change. Since the rate of change of the signals on lines 24 and 26 is zero, equal signals will reach the device 40 through lines 54 and 56 and through lines 49 and 51. Accordingly, the signals will cancel each other in the device 40, and therefore, the output from the response limiting circuit 18 will be zero. Hence, the remainder of the system will receive a zero signal and therefore the output shaft 130 of the actuator 16 will remain stationary. It will be appreciated then that the lateral disturbance compensating system 10 will have no effect on vehicle steering. This, of course, is the desired result since the vehicle had not encountered a lateral disturbance.

Next, consider the case where the vehicle is proceeding on a straight course and encounters a lateral disturbance such as a wind gust or a road irregularity. The lateral disturbance will cause a course deviation of the vehicle or yaw motion of the vehicle which will be sensed by the vortex rate sensor 12. In response to the yaw motion, an output signal on lines 24 and 26 of the vortex rate sensor 12 will be provided which is representative of the direction of the yaw motion and the yaw rate. The direction of yaw motion is represented by the fluid line, 24, or 26, which contains the highest flow rate whereas the amount of yaw rate is represented by the differential rates of flow in fluid lines 24 and 26. Since the course deviation has been caused by a lateral disturbance, the rate of change of course deviation will be above the predetermined rate at which the response limiting system 18 has been preset. Accordingly, the signal on lines 24 and 26 from the vortex rate sensor 12 will be impeded by the volumes 58. On the other hand, the signal will pass unimpeded on lines 49 and 51. Therefore, as explained previously, the proportional jet-on-jet device 40 will respond to the output signal of the vortex rate sensor on lines 49 and 51 and provide an amplified signal corresponding thereto on its output channels 62 and 64. In turn, the signal from the device 40 will be amplified by the amplifying circuit 72 and transmitted to the limited authority actuator 16. The signal is essentially a difference in flow rates between lines 96 and 98. This difference in flow rates is applied to opposite ends of the spool 108 thereby creating a differential pressure across the spool 108 and a corresponding movement of the spool towards the side of lower pressure. This movement exposes the selected one of the output passages 122 or 124 to the supply pressure in the supply chamber 112 causing flow into the selected passage from the source 110. Flow into these fluid passages, as explained above, rotates the output shaft 130 in a preselected direction to provide steering of the vehicle according to the course correction signal on lines 96 and 98, and hence, corrective steering which compensates for the lateral disturbance.

It can be seen from FIG. 1 that the extension 176 moves with the shaft 130 to provide a flow differential between flow lines 188 and 190 corresponding to the amount of actual steering correction. A flow differential in the lines 188 and 190 is applied to the amplifier circuit 72 as a feedback signal. It will be appreciated that the feedback signal opposes the input signal to the amplifier circuit 72 in proportion to the actual movement of the actuator output shaft 130 thereby providing accurate position control of the output shaft 130. Furthermore, the feedback signal serves to return the actuator output shaft 130 to the neutral position when no correction signal is received by the amplifier circuit 72.

Consider now the case in which the vehicle negotiates a normal driver-induced turn and the vehicle does not encounter a lateral disturbance. Since a vehicle is negotiating a turn, it will experience a yaw rate. The vortex rate sensor 12 will sense the yaw rate and provide an output signal on lines 24 and 26 which is representative thereof. Since the vehicle is undergoing a normal driver-induced turn, the rate of change of course deviation will be below the predetermined rate of change at which the response limiting circuit 18 is preset. Accordingly, the signals on lines 24 and 26 from the vortex rate sensor 12 will not be impeded by the volumes 58 and they will oppose substantially the same signal which is on lines 49 and 51 at the device 40. Hence, the signals will be cancelled and the output from the device 40 on output channels 62 and 64 will be zero. Since the signal transmitted to the remainder of the system is zero, the lateral disturbance compensating system 10 will not provide a steering correction. It will then be appreciated that in the case of a normal driver-induced turn without a lateral disturbance, the lateral disturbance compensating system 10 will have no effect on the steering of the vehicle.

Considering now the case where the vehicle negotiates a driver-induced turn and encounters a lateral disturbance. It will be appreciated that there will be a course deviation of the vehicle due to the lateral disturbance, and in addition, there will be a course deviation due to the driver-induced turning of the vehicle. These two components of course deviation may either add or subtract to provide a net course deviation. The vortex rate sensor 12 will provide an output signal on the output lines 24 and 26 which is representative of the net course deviation of the vehicle. Therefore, the output signal from the vortex rate sensor 12 can be considered to have two components, a component representative of the course deviation due to the driver steering command and a component representative of the course deviation due to the lateral disturbance.

As stated previously, the course deviation due to the lateral disturbance will be at a rate higher than the predetermined rate at which the response limiting circuit 18 is present whereas the course deviation due to the normal driver steering command will be at a rate below the predetermined rate. By virtue of this relationship, the two components of the output signal from the vortex rate sensor 12 may be considered to be a signal of high frequency superimposed on a signal of low frequency. The system of the present invention distinguishes the two signals through frequency (i.e., rate of change) discrimination, accomplished by the response limiting circuit 18. As explained previously, signals from the vortex rate sensor 12 on lines 24 and 26 which are representative of low rates of change are cancelled by the jet-on-jet device 40 whereas signals representative of high rates of change are effective in diverting the fluid flow in the device 40 such that output signal from the device 40 is only representative of vortex rate sensor output signals having high rates of change. This operational distinction between signals having high or low rates of change persists even though the signals are mixed. Therefore, the component representative of the course deviation of the vehicle due to the lateral disturbance is the sole component represented in the output of the device 40. The output of the proportional jet-on-jet device 40 is then transmitted to the remainder of the system 10 to provide corrective steering of the vehicle.

Considering now the operation of the lateral disturbance compensating system 10 using the circuit 218 of FIG. 3 in place of the circuit 18 of FIG. 1, it will be appreciated that the operation of the system 10 with respect to lateral disturbances and driver-induced turns of the normal rate will be the same as described above. However, in the event that an emergency steering correction is made, a course deviation will result having a rate of change higher than the second predetermined range. Accordingly, the circuit 218 will impede or cancel most of the signal from the vortex rate sensor 12 representative of that course deviation. Hence, the lateral disturbance compensating system 10 will not effect the steering of the vehicle and consequently the vehicle will respond substantially without diminuation of the driver steering command.

In view of the above description, it will be appreciated that the present invention provides a low cost and reliable fluidic lateral disturbance compensating system. It also provides increased safety over the steering systems of the prior art, and in addition, is more refined in operation since it effectively distinguishes between course deviations due to lateral disturbances and course deviations due to driver steering commands. All of the fluidic components described herein are particularly adapted for efficient incorporation into a system suitable for automotive use. In addition, this system may be used with a variety of actuators and therefore can be conveniently incorporated with existing steering system designs.

While we have described preferred embodiments of the present invention, it should be understood that various changes, adaptations and modifications may be made therein without departing from the spirit of the invention and the scope of the appended claims.

We claim:
1. A steering system for a land vehicle comprising:
   means for steering said land vehicle in response to operator commands a fluidic system including a fluidic sensor mounted on said vehicle for providing sensor fluid signals representative of course deviations of said vehicle; and
   means to effect steering of said land vehicle in response to said sensor fluid signals to correct for said course deviations of said vehicle;
   means for distinguishing course deviations due to normal driver steering commands to prevent response of said fluidic system to said normal commands.

2. The steering system of claim 1 including means for limiting the degree of steering of said land vehicle in response to said sensor signals to a predetermined maximum amount which is substantially less that the degree of steering of said land vehicle in response to said operator commands thereby limiting the authority of said system.

3. A steering system for a land vehicle comprising:
 means for steering said land vehicle in response to operator commands;
 a fluidic system including a fluidic sensor mounted on said vehicle for providing sensor fluid signals representative of course deviations of said vehicle; and
 means to effect steering to correct for said course deviations of said vehicle;
 means for distinguishing course deviation due to normal driver steering commands to prevent response of said fluidic system to said normal commands;
 means for distinguishing course deviations having rates of change within a predetermined range of rates of change to substantially prevent steering of said vehicle due to sensor fluid signals generated in response to normal driver steering commands.

4. The steering system of claim 3 wherein said distinguishing means limits the response of said system to course deviations having rates of change above a predetermined rate of change.

5. The steering system of claim 4 wherein said distinguishing means cancels sensor fluid signals representative of course deviations having rates of change below said predetermined rate of change.

6. The steering system of claim 3 wherein said distinguishing means further limits the response of said system to course deviations having rates of change below a second higher predetermined rate of change, said first-mentioned predetermined rate of change and said second predetermined rate of change defining said predetermined range of rates of change.

7. The steering system of claim 6 wherein said distinguishing means cancels sensor fluid signals representative of course deviations having rates of change outside of said predetermined range.

8. A steering system for a land vehicle comprising:
 means for steering said land vehicle in response to operator commands; a fluidic sensor mounted on said vehicle for providing sensor fluid signals representative of course deviations of said vehicle;
 fluidic amplifier means operably connected to said fluidic sensor for providing amplified fluid signals representative of steering corrections required to compensate for said course deviations; and
 means interconnecting said steering means and said fluidic amplifier to steer said land vehicle in response to said amplified fluid signals to correct for said course deviations;
 limiting means limiting the response of said system to course deviations having rates of change within a predetermined range wherein course deviations due to lateral disturbances primarily occur.

9. The steering system of claim 8 wherein said limiting means cancels sensor fluid signals representative of course deviations having rates of change below said predetermined rate of change.

10. The steering system of claim 9 wherein said limiting means further limits the response of said system to course deviations having rates of change below a second higher predetermined rate of change, said first-mentioned predetermined rate of change and said second predetermined rate of change defining said predetermined range of rates of change.

11. The steering system of claim 10 wherein said limiting means cancels sensor fluid signals representative of course deviations having rates of change outside of said predetermined range.

12. A steering system for a land vehicle comprising:
 means for steering said land vehicle in response to operator commands; a fluidic sensor mounted on said vehicle for providing sensor fluid signals representative of course deviations of said vehicle;
 fluidic amplifier means operably connected to said fluidic sensor for providing amplified fluid signals representative of steering corrections required to compensate for said course deviations; and
 means interconnecting said steering means and said fluidic amplifier to steer said land vehicle in response to said amplified fluid signals to correct for said course deviations;
 means for limiting the degree of steering of said land vehicle in response to said amplified signals to a predetermined maximum amount which is substantially less than the degree of steering of said land vehicle in response to operator commands thereby limiting the authority of said system.

13. In a lateral disturbance compensating system for a land vehicle including a fluidic sensor mounted on the vehicle having an output for providing sensor fluid signals representative of course deviations of said vehicle;
 means for limiting the response of the system to sensor signals within a predetermined range of rates of change comprising:
 a fluidic device having a supply port for flow of a supply fluid;
 an output port;
 a first and a second control port;
 means controlling the amount of supply fluid entering said output port to correspond to the difference between the rates of flow entering said first and second control ports respectively;
 means connecting said second control port to said output fluidic sensor to receive said sensor fluid signals; and
 means connecting said first control port with said output of said fluidic sensor to receive said fluid signals, said means including a volume connecting said first control port with the output of said fluidic sensor, said volume has a capacity such that sensor fluid signals above a predetermined rate of change are impeded by said volume whereas sensor signals below said predetermined rate of change are substantially unimpeded by said volume.

14. The lateral disturbance compensating system of claim 13 wherein said means connecting said second control port and said fluidic sensor includes a second volume interposed between said output of said fluidic sensor and said second control port, said second volume being of smaller capacity than said first volume thereby impeding sensor fluid signals from said fluidic sensor above a second predetermined rate of change which is higher than said first-mentioned predetermined rate of change.

15. A lateral disturbance steering compensating system for a land vehicle having a system for steering said vehicle in response to operator commands comprising:
 a fluidic sensor mounted on the vehicle having a pair of outputs for providing a pair of sensor fluid signals representative of course deviations of said vehicle;
 means for limiting the response of the system to sensor signals within a predetermined range of rates of change comprising:
 a proportioning fluidic device having a supply passage for flow of a supply fluid,
 two output channels for egress of said supply fluid,
 a first pair and second pair of control ports,
 one port of each pair for diverting said supply flow into one of said output channels, and the other port of each pair for diverting said supply flow into the other of said output channels, said one port of said first pair of control ports connected to one of said outputs of said fluidic sensor for receiving one sensor signal and said other port of said second pair of control ports connected to the other of said outputs of said fluidic sensor for receiving the other sensor signal;
 a pair of volumes, one of said volumes connecting the one sensor output with said other port of said first pair, and the other of said volumes connecting the other sensor output of said fluidic sensor with said one port of said second pair of control ports, said volumes having preselected capacities for impeding components of said sensor signals having rates of change above a predetermined rate of change; and means associated with said steering system for effecting steering of said vehicle in response to said limited sensor signals.

16. The lateral disturbance compensating system of claim 15 wherein said limiting means includes a second pair of volumes, one of said second pair of volumes being interposed between the one sensor output and said one port of said first pair, and said other of said volumes being interposed between the other sensor output and said other port of said second pair of control ports, said second volumes having preselected capacities which are less than said capacities of said first-mentioned volumes for impeding components of said sensor signals having rates of change above a second predetermined rate of change which is higher than said first-mentioned predetermined rate of change.

17. A steering system for a land vehicle comprising:
means for steering said vehicle in response to operator commands;
a sensor mounted on said vehicle for providing sensed signals representative of course deviations of said vehicle;
means for limiting the response of said system to course deviations having rates of change within a predetermined range of rates of change wherein course deviations due to lateral disturbances primarily occur; and
means effective to steer said vehicle in response to said sensor signals within said predetermined range to compensate for said course deviations.

18. A steering system for a land vehicle comprising:
means for steering said vehicle in response to operator commands;
a vortex rate sensor mounted on said vehicle for providing a pair of output fluid signals representative of course deviations of said vehicle;
a proportioning fluidic device having a supply passage for flow of a supply fluid, two output channels for egress of said supply fluid, a first pair and a second pair of control ports, one port of each pair for diverting said supply flow into one of said output channels, and the other port of each pair for diverting said supply flow into the other of said output channels, said one port of said first pair of control ports connected to said rate sensor for receiving one output signal of said vortex rate sensor and said other port of said second pair of control ports connected to said rate sensor for receiving the other output signal of said vortex rate sensor;
a pair of volumes, one of said volumes receiving said one output signal of said vortex rate sensor and the other of said volumes receiving said other output signal of said vortex rate sensor, said one volume being connected to said other port of said first pair of said control ports and said other volume being connected to said one port of said second pair of control ports;
an amplifier circuit operably connected to said output channels of said proportioning fluidic device for amplifying fluid signals therefrom in a manner to provide a pair of amplified fluid signals representative of steering corrections required to compensate for said course deviations; and means interconnecting said steering means and said amplifier circuit for modulating the steering of said land vehicle in response to said pair of amplified fluid signals to correct for said course deviations including, means for limiting the degree of steering caused by said interconnecting means to a predetermined maximum amount which is substantially less than the degree of steering of said land vehicle in response to said operator commands thereby limiting the authority of said system, and further including summing means for receiving said operator commands and for steering said land vehicle in response to the sum of said operator commands and said amplified signals, said summing means including a mechanical link for steering said vehicle according to said operator commands when either said vortex rate sensor, said proportioning fluidic device, said amplifier circuit, or said interconnecting means is inoperative 19. A steering system for a land vehicle comprising:
a sensor system including a sensor mounted on said vehicle for providing signals representative of course corrections required to compensate for course deviations sensed by said sensor;
means for steering said land vehicle in response to operator commands and in response to said signals;
feedback means for providing feedback signals representative of actual steering of said land vehicle in response to said signal; and
means operatively connected to said feedback means for summing said feedback signals and said course correction signals to modulate said course correction signals.

20. A steering system for a vehicle comprising:
a manually actuatable member;
means for steering said vehicle in response to movement of said member, including an actuator element drivingly connected to said member and normally moving therewith;
sensor means for sensing steering disturbances of said vehicle and generating signals representative thereof;
means for causing relative movement between said member and said element in response to said signals, whereby said steering is influenced by said disturbances; and
positive stop means limiting the relative movement of said member and said element to that substantially less than the range of movement of said member in actuating said steering system, whereby a limited authority influence is provided.

21. The system of claim 20 further including feedback means generating signals indicating the extent of relative movement of said member and said element, means for modifying the effect of said sensor means signals on the relative movement of said member and said element in response to said feedback means signals.